(12) United States Patent
Hoernicke et al.

(10) Patent No.: US 12,379,715 B2
(45) Date of Patent: Aug. 5, 2025

(54) COMPUTERIZED OPTIMIZATION OF AN ENGINEERED MODULAR PLANT TOPOLOGY

(71) Applicant: ABB Schweiz AG, Baden (CH)

(72) Inventors: Mario Hoernicke, Landau (DE); Katharina Stark, Weinheim (DE); Dirk Schulz, Meckenheim (DE)

(73) Assignee: ABB Schweiz AG, Baden (CH)

(*) Notice: Subject to any disclaimer, the term of this patent is extended or adjusted under 35 U.S.C. 154(b) by 410 days.

(21) Appl. No.: 17/892,643

(22) Filed: Aug. 22, 2022

(65) Prior Publication Data

US 2023/0090322 A1 Mar. 23, 2023

Related U.S. Application Data (63) Continuation of application No. PCT/EP2020/054785, filed on Feb. 24, 2020.

(51) Int. Cl.
*G05B 19/418* (2006.01)
*G06Q 10/06* (2023.01)
*G06Q 50/04* (2012.01)

(52) U.S. Cl.
CPC ....... *G05B 19/41865* (2013.01); *G06Q 10/06* (2013.01); *G06Q 50/04* (2013.01); *G05B 2219/31054* (2013.01)

(58) Field of Classification Search
CPC .... G05B 19/41865; G05B 2219/31054; G06Q 10/06; G06Q 50/04
See application file for complete search history.

(56) References Cited

U.S. PATENT DOCUMENTS

| | | | |
|---|---|---|---|
| 2007/0050070 A1 | 3/2007 | Strain et al. | |
| 2010/0082119 A1 | 4/2010 | Case et al. | |
| 2012/0109662 A1* | 5/2012 | Shah | G06Q 30/0283 705/1.1 |
| 2022/0121181 A1* | 4/2022 | Sobalvarro | G05B 19/4188 |

FOREIGN PATENT DOCUMENTS

| | | | |
|---|---|---|---|
| CN | 101537567 B | * | 11/2011 |
| EP | 1416408 A2 | | 5/2004 |
| EP | 3514741 A1 | | 7/2019 |
| WO | WO 2016/134761 A1 | | 9/2016 |

OTHER PUBLICATIONS

European Patent Office, International Search Report in International Patent Application No. PCT/EP2020/054785, 4 pp. (Nov. 19, 2020).
European Patent Office, Written Opinion in International Patent Application No. PCT/EP2020/054785, 7 pp. (Nov. 19, 2020).

* cited by examiner

*Primary Examiner* — Michael W Choi
(74) *Attorney, Agent, or Firm* — Leydig, Voit & Mayer, Ltd.

(57) ABSTRACT

A computer-implemented method includes obtaining an amount of a resource and/or capability of a process module, and dividing this amount by the maximum amount of the respective resource and/or capability to obtain a theoretical utilization of the resource and/or capability as the theoretical utilization of the process module. A pool of available process modules is searched to identify candidate process modules to replace the process module. The theoretical utilization for each candidate module is determined and an optimized topology of the plant is generated by replacing the process module with a candidate process module that has a same or a higher theoretical utilization than process module.

18 Claims, 3 Drawing Sheets

COMPUTERIZED OPTIMIZATION OF AN ENGINEERED MODULAR PLANT TOPOLOGY

CROSS-REFERENCE TO RELATED APPLICATIONS

This patent application claims priority to International Patent Application No. PCT/EP2020/054785, filed on Feb. 24, 2020, which is incorporated herein in its entirety by reference.

FIELD OF THE DISCLOSURE

The present disclosure relates to the optimization of the topology of modular industrial plants that are to execute a given industrial process according to a given recipe and are assembled from re-usable modules.

BACKGROUND OF THE INVENTION

In many industrial applications, there is a need to quickly reconfigure plants from one production process to another production process. For example, the product that is being produced may be under quick evolution, and every improvement in quality is to be brought into the production process as quickly as possible to maximize customer satisfaction. There are also some products that are so concentrated in terms of end effect per unit mass or volume that a year's supply may be produced in only a few weeks' time. Pharmaceutical compositions, which are delivered to patients in doses on the order of a few ten or a few hundred milligrams, are prime examples of such products.

Plants for manufacturing such compositions may be assembled as modular plants from self-contained modules that take in one or more educts on one or more input ports, process the one or more educts to one or more products by performing one or more physical and/or chemical actions, and deliver the one or more products on one or more output ports. The modules are linked together in a temporary manner for the time during which production of one a particular compound is desired. When production of this compound is finished and production of the next compound is desired, the modules are uncoupled from one another, so that they can be re-used in a different configuration. EP 3 318 935 A1 discloses an exemplary method of operating a physical process module in a modular process plant.

BRIEF SUMMARY OF THE INVENTION

The present disclosure describes systems and methods for at least partially automating the engineering process through transforming, by computer, an engineered topology that is able to execute the given process into an optimized topology that is able to execute the same process but utilizes the physical process modules better. This objective is achieved by a computer-implemented method for optimizing a given topology of a modular plant and by a method for manufacturing a modular industrial plant.

More specifically, the present disclosure describes a computer-implemented method for optimizing a given topology of a modular industrial plant that is to execute a given industrial process. The industrial process as a whole may take in one or more educts and convert these educts, by performing a sequence of specific tasks given in the recipe, into one or more products. The tasks are performed by the process modules that are assembled according to the topology. The method starts from a given topology that may be a human-engineered topology, but may also be a topology that, starting from such a human-engineered topology, has already been optimized in one or more computerized steps.

The method starts with obtaining, for at least one process module in the given topology, the amount of at least one resource and/or capability of the module that is utilized when the process is executed according to the recipe. This amount is divided by the maximum amount of the respective resource and/or capability that this process module is able to provide. This yields a theoretical utilization of the resource and/or capability, which may also be regarded as the theoretical utilization of the process module.

A pool of available modules is searched for candidate process modules that are able to take the place of the at least one process module in the execution of the given recipe and fit into the given topology. In other words, the given process is still executed according to the same given recipe if the at least one process module under consideration is replaced with one of the candidate process modules.

For each candidate process module, the theoretical utilization of the corresponding resource and/or capability of this candidate process module that would ensue if the at least one process module under consideration were to be replaced by this candidate process module is obtained and assigned to this candidate module. From the given topology, an optimized topology is generated by replacing the at least one process module that is currently under consideration with a candidate process module that has a same or, preferably, a higher theoretical utilization than the at least one process module.

If the theoretical utilization of the new module in the optimized topology is higher than the theoretical utilization of the old module that was in its place in the previous topology, this means that the amount of the resource and/or capability installed in this place now more closely matches the demand for this resource and/or capability.

If the theoretical utilization of the new module is the same as the theoretical utilization of the old module, then the new module is at least equivalent to the old one in terms of resource utilization. Among such equivalent modules, one module may be chosen according to any other optimality criterion. In this manner, the topology of the plant may be improved with respect to this other criterion without having to take a turn for the worse in terms of resource utilization.

Such partial automation reduces the cost of the plant both in terms of physical process modules and in terms of human engineering hours, thereby increasing the productivity of the final industrial plant assembled from process modules according to the topology.

DETAILED DESCRIPTION OF THE INVENTION

Figure 1:
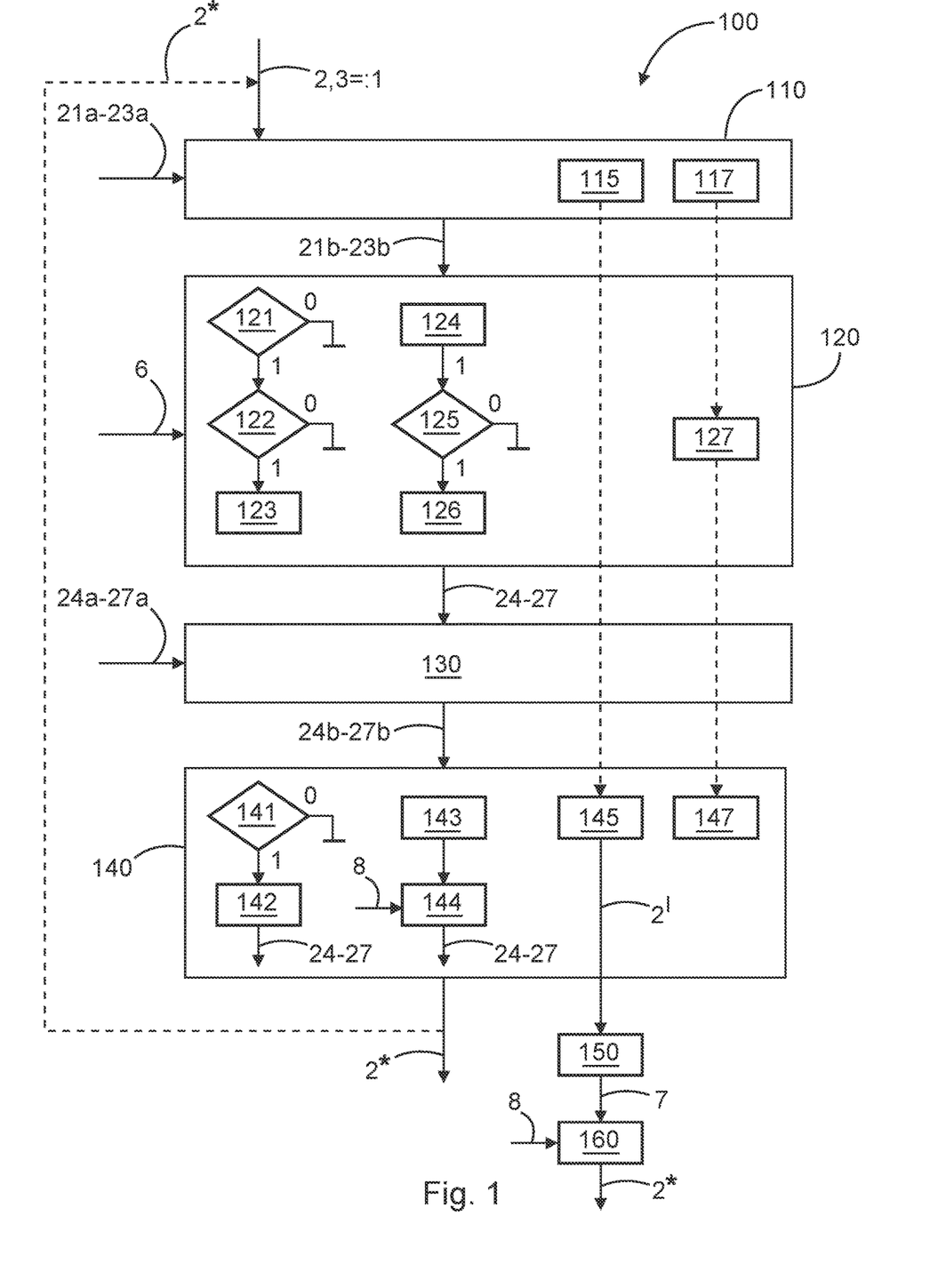
FIG. 1 is a flowchart for a method in accordance with the disclosure.

FIG. 1 is a schematic flowchart of an exemplary embodiment of the method 100 for optimizing a given topology 2 of a modular industrial plant 1. The modular plant 1 is to execute a given industrial process according to a given engineered recipe 3. The topology 2 may be engineered to execute this recipe, and/or it may also be the result of a previous optimization.

In step 110, for at least one process module 21-23 in the given topology 2, the amount of at least one resource and/or capability 21a-23a of the process module 21-23 that is utilized when the process is executed according to the recipe 3 is obtained. This amount is divided by the maximum amount of the respective resource and/or capability 21a-23a that this process module 21-23 is able to provide. The result is the theoretical utilization 21b-23b of the resource and/or capability 21a-23a, which may also be regarded as the utilization of process module 21-23. It is pre-set which resource and/or capability 21a-23a is to be investigated.

In step 120, a pool 6 of available process modules 24-27 is searched for candidate process modules 24-27 that are able to take the place of the process module 21-23 under consideration and also fit into the given topology 2.

Specifically, for each input port I of the at least one process module 21-23 that is utilized according to the given topology 2, it may be determined in block 121 whether the candidate process module 24-27 has a corresponding input port I. It may then also be determined in block 122, for each output port O of the at least one process module 21 23 that is utilized according to the given topology, whether the candidate process module 24-27 has a corresponding output port O. If both determinations are positive (truth value 1), then it may be determined in block 123 that the candidate process module 24-27 fits into the given topology 2.

Alternatively or in combination, it may be determined in block 124 whether, in the state where all connections to ports I, O of the candidate process module 24-27 have been made according to the given topology 2, all ports I, O of the candidate process module 24, 27 that are required for running the utilized services of the candidate process module 24-27 are connected. If it is determined in subsequent block 125 that a utilized service of the candidate process module 24-27 cannot run because a connection to a port I, O is missing (truth value 1), it may be determined in block 126 that the candidate process module 24-27 does not fit into the given topology 2.

In step 130, for each candidate process module 24-27, the theoretical utilization 24b-27b of the corresponding resource and/or capability 24a-27a of this candidate process module 24-27 that would ensue if the at least one process module 21-23 were to be replaced by this candidate process module 24-27 is obtained. This theoretical utilization 24b-27b is assigned to the candidate process module 24-27. Here, the resource 24a-27a whose theoretical utilization 24b-27b is determined corresponds to the resource 21a-21a of the process module 21-23 under consideration.

In step 140, an optimized topology 2* of the plant 1 is generated from the given topology 2 by replacing the at least one process module 21-23 with a candidate process module 24-27 that has a same or a higher theoretical utilization 24b-27b than the at least one process module 21-23 under consideration. As discussed before, the process may be repeated. I.e., the optimized topology 2* may be fed into step 110 again to increase the utilization in more places. For example, after one module 21-23 previously used according to the topology 2 has been freed up in the optimized topology 2*, this module 21-23 may be put in the pool 6 of available modules in lieu of the module that has taken its place in the optimized topology 2*. This may open up new possibilities for increasing the utilization further.

According to block 141, it may be determined whether two or more candidate process modules 24-27 have a same theoretical utilization 24b-27b that is the same or higher than that 21b-23b of the at least one process module 21-23. If this is the case (truth value 1), according to block 142, the candidate process module 24-27 with the lowest total number of input I and output O ports may be chosen as the candidate process module 24-27 to replace the at least one process module 21-23.

According to block 143, for two or more candidate process modules 24-27 having theoretical utilizations 24b-27b that are at least as high as that 21b-23b of the at least one process module 21-23, the value of at least one predetermined key performance indicator 7 that would ensue if the at least one process module 21-23 were to be replaced by this candidate process module 24-27 may be evaluated. Then, according to block 144, the candidate process module 24-27 with the best resulting value of the key performance indicator 7 as the candidate process module 24-27 to replace the at least one process module 21-23. Which value of the key performance indicator 7 is best may be determined according to any suitable optimality criterion 8.

According to block 115, the utilized amount of the at least one resource and/or capability 21a-23a may be specifically obtained for multiple different process modules 21-23 in the given topology 2. After passing through steps 120 and 130 as discussed before, in block 145 within step 140, a respective candidate optimized topology 2' of the plant 1 may then be generated for each different processing module 21-23 that the optimization is started from. In step 150, a value of at least one key performance indicator 7 that would ensue if the candidate optimized topology (2') were to be implemented may be determined. In step 160, from the set of candidate optimized topologies 2', one optimized topology 2* may be chosen according to the values of the key performance indicator 7 and at least one optimality criterion 8.

According to block 117, the utilized amount of the at least one resource and/or capability 21a-23a may be specifically obtained for a combination of two or more interconnected process modules 21-23, rather than for just one process module 21-23. Then, according to block 127, the searching of step 120 may be specifically performed for candidate process modules 24-27 that are able to replace said combination of process modules 21-23, rather than just one process module 21-23. The candidate process modules 24-27 still need to fit into the given topology 2, as in the case where they are to replace just one process module 21-23. According to block 147 in step 140, the optimized topology 2* of the plant may be generated by replacing the combination of two or more interconnected process modules 21-23, rather than just one process module 21-23, with a candidate process module 24-27 that has a same or a higher theoretical utilization 24b-27b than said combination of two or more process modules 21-23. For a combination of modules, a theoretical utilization is defined in exactly the same manner as for an individual module.

Figure 2:
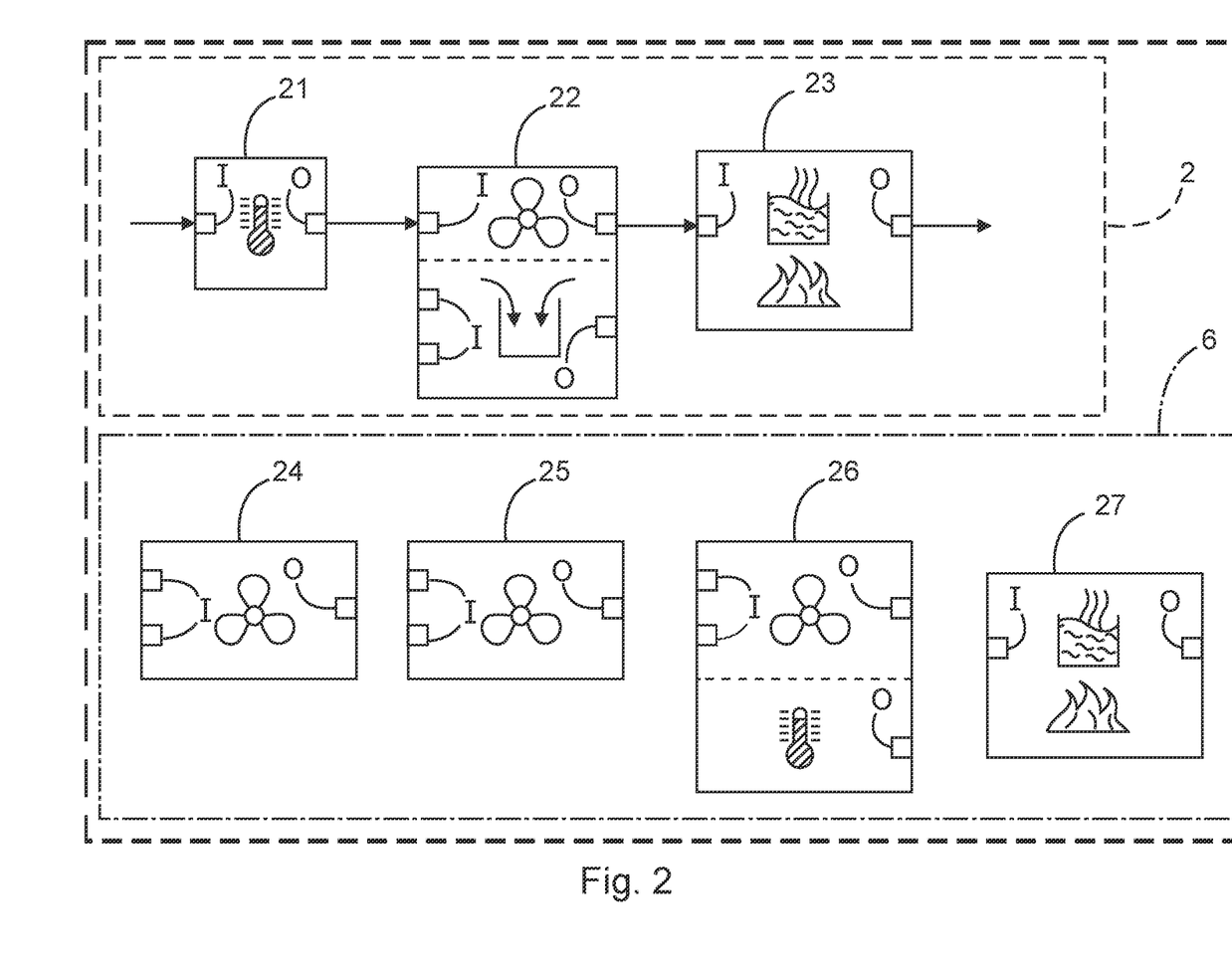
FIG. 2 is a diagram of an exemplary engineered topology with process modules that may be optimized using a pool of available modules in accordance with the disclosure.

FIG. 2 shows a simple example of an engineered topology 2 for a modular industrial plant 1. The topology 2 comprises a tempering module 21, a combined mixing and stirring module 22, and a distillation module 23. An input I* of the to-be-run process as a whole is fed into input port I of the tempering module 21. The outcome of the tempering leaves output port O of the tempering module 21 and enters the combined mixing and stirring module 22 at an input port I of this module. The stirred substance leaves output port O of the mixing and stirring module 22 and enters the distillation module 23 at input port I. The distilled product is the output O* of the to-be-run process as a whole and leaves the distillation module 23 at output port O.

The pool 6 of available modules 24-27 comprises one stirring module 24 with two input ports I and one output port O, one stirring module 25 with one input port I and one output port O, a combined stirring and tempering module 26, and another distillation module 27.

In the engineered topology 2, the tempering module 21 and the distillation module 23 are already fully utilized. They each provide one service as a resource 21a, 23a, and this service is needed for the process that is to be executed, so the utilization 21b, 23b is 1. Therefore, the is no replacement for these modules that might improve utilization 21b, 23b. However, it is possible to replace distillation module 23 with distillation module 27 that then will have the same utilization 27b of 1. This may be advantageous if the distillation module 27 is advantageous with respect to some key performance indicator 7, compared with distillation module 23.

Combined stirring and mixing module 22 provides two services, namely stirring and mixing, as resource 22a. Only one service, namely the stirring, is being used according to the topology, so the utilization 22b of the combined module 22 is only 0.5.

Replacing the stirring and mixing module 22 with the stirring module 24 would result in an utilization 24b of 1. However, in this example, stirring module 24 has two input ports I and expects both of them to be connected for the stirring to work. Therefore, while the stirring module 24 would improve utilization, it does not fit into the topology 2 because it would not function if inserted in the place of the combined module 22.

The stirring module 25 has one input port I and one output port O. This means that this stirring module 25 fits into the topology 2. It also has an utilization 25b of 1 when inserted in the place of the combined module 22. Therefore, replacing the combined module 22 with the stirring module 25 improves the utilization and frees up the combined stirring and mixing module 22 for other uses in other plants on the same site.

The tempering function of tempering module 21 and the used stirring function of combined module 22 might also be consolidated into one module by inserting the combined tempering and stirring module 26 in the place of modules 21 and 22. Module 26 provides two services as its resource 26a, and this resource 26a would have an utilization 26b of 1. However, module 26 has two output ports O and expects both of them to be connected if both the stirring and the tempering are needed. Therefore, akin to module 24, combined module 26 cannot replace modules 21 and 22 because it does not fit into the topology 2.

Figure 3:
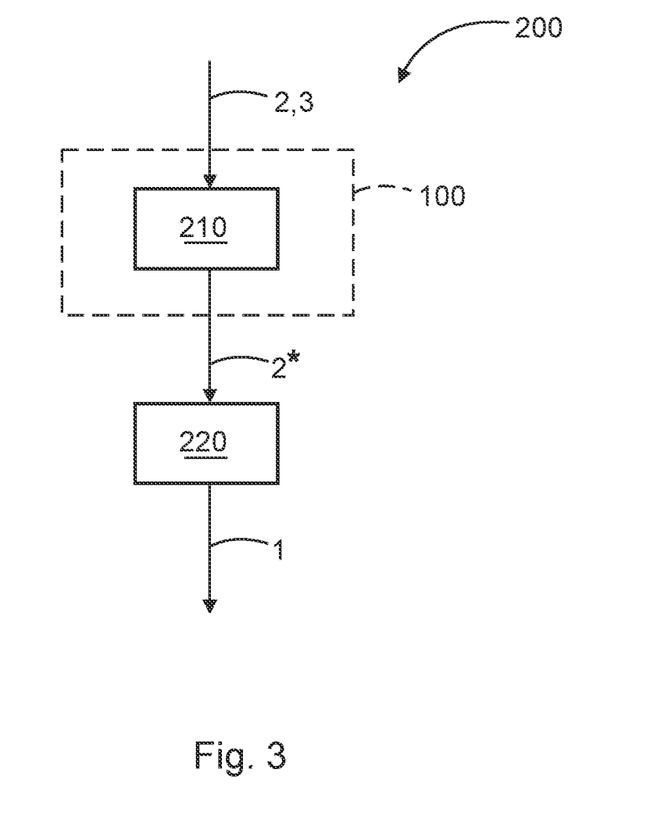
FIG. 3 is a flowchart for a method of manufacturing a modular plant in accordance with the disclosure.

FIG. 3 is a schematic flowchart of an exemplary embodiment of the method 200 for manufacturing a modular industrial plant 1 to execute a given industrial process according to a given engineered recipe 3. In step 210, starting from a given engineered topology 2 of the plant 1, an optimized topology 2* of the plant 1 is generated using the computer-implemented method 100 described before. In step 220, the physical process modules 21-27 that are contained in the optimized topology 2* are physically connected according to the optimized topology 2*. In this manner, the modular industrial plant 1 is produced.

Starting from a recipe of the industrial process that is to be executed, it is quite easy for an engineer to come up with at least one topology that will allow the process to be executed. For example, the engineer may choose to pick most modules in the topology from a small set of universal modules that each provide a lot of different process functions. This minimizes engineering time, but may be suboptimal for the outcome of the process and also for the productivity of a site where several modular plants assembled from a common set of available modules are to be operated.

There is a general tendency that the more different process functions one single module unites, the less this module will excel in performing every single one because the uniting of all those functions requires some technical trade-off. Therefore, for every process function, the best performance may be expected from a process module that is dedicated to this particular process function. The situation is somewhat akin to the field of computing: A generic CPU may be able to perform any task, but if one task (like mining Bitcoin) is to be performed in the fastest and most energy-efficient manner, there may be no way around an ASIC that is dedicated to this one task.

On a site where a modular industrial plant is being run, there is usually more than one such plant running at any given time. The concurrently running plants are usually assembled from process modules that are taken from a common pool of process modules. This introduces an interdependency between the topologies of the concurrently running plants, and the efficiency of module utilization needs to be assessed site-wide, i.e., across the borders between the individual plants.

In a toy example, process A is to be executed on a first plant and needs a module capable of heating a substance, process B is to be executed on a second plant and needs a module capable of heating and stirring a substance, and the pool of available modules comprises heaters, stirrers and one universal module capable of heating and stirring. While it is a working solution to use the universal module for process A, this has the downside of requiring two more modules (a heater and a stirrer) for process B, so process A and process B together need three modules. It is better to use a simple heater for process A and to use the universal module for process B; this saves the use of a stirrer.

Therefore, by improving utilization of individual process modules, the topology of a plant that is to execute one process can be made more "friendly" towards other processes to be run on different plants on the same site without having to know any details about these other processes. The optimization happens within the scope of only one process, which is much more tractable computationally than an optimization across all plants on a given site.

The criterion of theoretical utilization introduces a layer of abstraction behind which any amount of complexity of the process may be "hidden". When considering a particular process module, the optimization is focused on this process module alone and does not require any further information about what shall happen with the products of this process module later. Theoretical utilization is therefore a very useful framework to condense the optimization of the topology, which was previously an art performed by engineers, into a numerical optimization problem that can be easily solved by computer. Specifically, a large set of candidate process modules that may take the place of a process module under consideration may initially be created, and from this large set, the best candidate process module may be found by a computer. Thus, the optimization of the topology is not just taken from the field of human engineering and automated "as it is". Rather, it is transformed into a form that is easily tractable for a computer, but would be much harder to understand for an engineer.

The given topology may specifically comprise: the feeding of at least one input of the industrial process as a whole to at least one input port of a process module; the delivery of at last one output of the industrial process as a whole from at least one output port of a process module; and at least one interconnection between an output port of a first process module and an input port of a second process module.

Typically, one input (i.e., educt) of the process as a whole will pass through multiple process modules and interact with at least one other such input on the way before finally being converted into an output (i.e., product) of the process as a whole.

The engineered recipe may specifically comprise a temporal sequence of process steps. Each step may comprise sending at least one command to at least one process module, and/or performing at least one action by at least one process module. Based on the recipe, it is known which process functions are needed at any one time, so it is straight-forward to engineer a topology of process modules that is able to execute the process according to the recipe. Also, any later amendments to the topology proposed by the optimization may be easily checked for whether the topology is still compatible with the recipe after the amendments.

In the recipe, at least one transition between successive steps may specifically comprise waiting for at least one process module to reach a state that meets at least one predetermined criterion. This simplifies the engineering of any further steps because said state may be taken as a given.

In a particularly advantageous embodiment, the pool of available process modules comprises, for each available process module, a mapping between services provided by this process module and process functions from a predetermined list. In this manner, the terminology regarding the services may be unified between different modules. For example, a service "Temp" of a first process module, a service "Heat" of a second process module, and a service "Tempering" of a third process module may all provide the process function of "Tempering".

The pool of available process modules may further comprise, for each available process module, a mapping between service parameters and limits of these service parameters on the one hand and function parameters of the process functions and limits of these function parameters on the other hand. In this manner, the parameters and their limits may be unified as well. For example, a first process module capable of tempering may specify a maximum voltage to a heating coil, a second process module capable of tempering may specify a maximum current through a heating coil, and a third process module capable of tempering may specify a maximum wattage of the heating coil. All these different specifications may be mapped to respective maximum temperatures that may be used during tempering.

In a further particularly advantageous embodiment, the resource and/or capability whose utilization is assessed specifically comprises a count of services of the at least one process module under consideration or of the candidate process module, respectively. This high level of abstraction allows to convert utilization into a number that is usable for the optimization without needing to know any details about the internal processes of the module.

For example, the service may specifically comprise one or more of: heating or cooling a substance, and/or keeping the temperature of the substance at a desired value; stirring a substance; filling at least one vessel with a desired amount of a substance; discharging a desired amount of a substance from at least one vessel; dosing a desired amount of a second substance into a first substance; intermixing a mixture of two or more substances by mechanical interaction with this mixture; distilling at least one substance from a mixture of two or more substances; transitioning at least one substance; and inertizing at least one sub stance.

In a further particularly advantageous embodiment, the resource and/or capability specifically comprises a quantity of at least one educt processed per unit time, and/or a quantity of at least one product produced per unit time. Many process modules are available with different quantitative capacities, and the used capacity should ideally match the capacity that is actually being used. For example, if a batch size is 1 cubic meter, it is not optimal to use a stirring module that is able to hold 3 cubic meters of mixture. This stirring module may be needed in another plant on the same site where the batch size is actually 3 cubic meters; if it is instead tied up in a place where it is only filled with 1 cubic meter, another 3 cubic meter module needs to be bought at additional expense. Also, the 3 cubic meter module takes up more valuable floor space than really needed in the 1 cubic meter process. If heating is required during the stirring, heating up a volume of 3 cubic meters instead of 1 cubic meter inside the module may also consume an overly high amount of energy.

In a further particularly advantageous embodiment, the resource and/or capability specifically comprises a measurement range, and/or a dynamic range, of at least one measurement instrument of the at least one process module or of the candidate process module, respectively. Akin to the previous examples, if a measurement instrument with a large measurement range is tied up in a process where only a fraction of this range is used, it may not be available in another plant on the same site where the large measurement range is needed. Also, if only a small fraction of the measurement range is used, the resolution of the measurement may suffer. In many measurement instruments, an analog-digital converter maps analog measurement values from the measurement range to digital output values that are expressed in a fixed number of bits, e.g., 32 bits. If only one eighth of the measurement range is actually used, then the information will be encoded within one eighth of the range of digital output values, i.e., in just 4 bits. In this case, most of the acquired information is thrown away. The measurement results only have full resolution if the measurement range is fully used.

In a further particularly advantageous embodiment, determining whether a candidate process module from the pool of available modules fits into the given topology specifically comprises: for each input port of the at least one process module that is utilized according to the given topology, determining whether the candidate process module has a corresponding input port; for each output port of the at least one process module that is utilized according to the given topology, determining whether the candidate process module has a corresponding output port; and if the candidate process module has a corresponding port for each utilized input port and output port of the at least one process module, determining that the candidate process module fits into the given topology.

This ensures that every connection that shall be made to the process module under consideration according to the topology can also be made to the candidate process module.

The check whether the candidate process module fits into the given topology may optionally be postponed until after the candidate process module has made it to the "shortlist" of candidate process modules that may make it into the optimized topology by virtue of its good theoretical utilization. This may save computation time during the optimization, particularly if the check whether the candidate process module fits into the given topology takes a lot longer than the calculation of the theoretical utilization of this candidate process module.

In the context of this check, a corresponding input port of the candidate process module may specifically be an input port that serves the same process function as the input of the at least one process module under consideration. Likewise, a corresponding output port of the candidate process module may specifically be an output port that serves the same process function as the output port of the at least one process module. In this manner, the determination whether the candidate process module fits into the given topology may be made more accurate particularly in a case where the candidate process module is a universal module that unites different process functions in one physical module. If an input port or an output port of the candidate process module is free, but this port pertains to a different process function than that used in the at least one process module that the candidate process module is to replace, the process will be executed differently after the change and may violate the given recipe.

For example, if the process module under consideration has two output ports for a dosing service, and the candidate process module has also two output ports for a dosing service, this is compatible with the given topology. But if the candidate process module only has one output port for a dosing service, while its second output port is for a tempering service, then this is not compatible with the given topology: if the candidate process module replaces the process module under consideration, the input port of another process module connected to the second output port of the candidate process module is supposed to receive a substance treated by the dosing service, but receives a tempered substance instead.

The determining whether the candidate process module fits into the given topology may further comprise: determining whether, in the state where all connections to ports of the candidate process module have been made according to the given topology, all ports of the candidate process module that are required for running the utilized services of the candidate process module are connected; and in response to determining that a utilized service of the candidate process module cannot run because a connection to a port is missing, determining that the candidate process module does not fit into the given topology.

For example, an older process module under consideration may only require connections for the input and output of substances to work, but a newer-generation candidate process module may additionally require a signal connection to a safety interlock system to halt the process in case a leakage of substances is detected. If this candidate process module takes the place of the older process module, it will not work because the safety interlock is not connected.

In a further particularly advantageous embodiment, in response to determining that two or more candidate process modules have a same theoretical utilization that is the same or higher than that of the at least one process module, the candidate process module with the lowest total number of input and output ports is chosen as the candidate process module to replace the at least one process module. The total number of input and output ports is another indicator of utilization of the candidate process module: If two candidate modules are able to play the same role in the industrial process as per the recipe, but one of them has extra ports, those extra ports are not mandatory for playing said role in the industrial process. Like the theoretical utilization discussed above, this indicator is an abstract one that does not require detailed knowledge about the internal processes of the candidate process module.

For example, two candidate process modules may provide only a tempering service that is used in the context of the process, so that in terms of services, they both have full theoretical utilization. But while the first candidate process module only has an input for the to-be-tempered substance and an output for the tempered substance, the second candidate process module also has an output port for various measurement values that are gathered during the tempering. Since both candidate process modules are usable in the place of the process module under consideration, the output port for the measurement values appears not to be required for the tempering in the context of the process. Therefore, it is preferable to use the first candidate process module. The second candidate process module might be needed in another plant elsewhere on the site where tempering under supervision using the measurement values is required.

In a further particularly advantageous embodiment, for two or more candidate process modules having theoretical utilizations that are at least as high as that of the at least one process module, the value of at least one predetermined key performance indicator that would ensue if the at least one process module were to be replaced by this candidate process module is evaluated. The candidate process module with the best resulting value of the key performance indicator is chosen as the candidate process module to replace the at least one process module. A key performance indicator is a summary figure of merit that may, for example, be attributed to the modular industrial plant, to the process executed by this plant, to a combination of multiple plants or processes running on the same site, or even to a whole site where multiple plants or processes are running. Thus, a key performance indicator may be used as a tool to rate the improvement that the optimized topology brings about across plant borders.

In this manner, the optimization may be at least partially focused on the predetermined key performance indicator. A better value of the key performance indicator causes a candidate process module to be preferred, under the boundary condition that the theoretical utilization at least does not get worse.

The key performance indicator may specifically comprise one or more of: a cost of executing the industrial process; a total number of modules in the industrial plant; a throughput from one or more educts to one or more products of the industrial process as a whole; and energy consumption of the industrial process. In particular, the cost of executing the industrial process may include the cost for use of the modules. For example, there may be multiple specialized candidate modules that may perform a particular process function and improve the theoretical utilization because they do exactly what is needed, and nothing more. But on the other hand, the use of a highly specialized, ultra-high-quality module may be more expensive than the use of a module that is less universal than the previously envisaged one but more universal (and thus less utilized) than the highly specialized one.

In a further particularly advantageous embodiment, the utilized amount of the at least one resource/capability is specifically obtained for multiple different process modules in the given topology. A respective candidate optimized topology of the plant is generated starting from each of these different process modules. For each candidate optimized topology, a value of at least one key performance indicator that would ensue if the candidate optimized topology were to be implemented is determined. One optimized topology is chosen from the candidate optimized topologies according to the values of the key performance indicator and at least one optimality criterion.

The reasoning behind this is that on the site where the modular plant is to be run, there is usually a limited stock of physical process modules. There may be multiple places in the given topology where a candidate process module may take the place of another process module in order to improve utilization and/or a key performance indicator. In particular, there may be more such places than there are instances of this candidate process module available. This means that a choice has to be made where to put the available instances of the candidate process module in order to achieve the maximum effect.

For example, there may be two places in the given topology where only a simple stirring function is needed. In the first place, the topology contains a multi-functional process module that has three more functions on top of the stirring. In the second place, the topology contains an even more multi-functional process module that has five more functions on top of the stirring. If the simple stirring module is inserted in the second place, this frees up the more valuable module for use in another place within the topology, or even for use in another plant on the same site.

In a further specially advantageous embodiment, the utilized amount of the at least one resource and/or capability is specifically obtained for a combination of two or more interconnected process modules. The searching is specifically performed for candidate process modules that are able to take the place of said combination of process modules and fit into the given topology. The optimized topology of the plant is generated by replacing said combination of two or more process modules with a candidate process module that has a same or a higher theoretical utilization than said combination of two or more process modules.

In this manner, a plurality of functions that reside in the interconnected modules may be consolidated in a candidate process module, under the condition that this does not create a new under-utilization. For example, a combination of a stirring module and a tempering module may be replaced by a combined stirring and tempering module that provides no other services. But a multi-functional module that provides five other services on top of the heating and stirring will not be proposed as a candidate process module because said five other services would be left idle. The consolidation of multiple functions into one process module may save floor space and energy, but this advantage may be over-compensated if a multi-functional module is tied up for this without actually using all of this module.

The optimized topology may be presented to an engineer in any suitable manner. For example, in a rendering of the given topology on a display, any process module that the optimized topology suggests to replace may be rendered differently from other modules to indicate that an advantageous replacement is available. For example, the process module may be rendered pale or in a different color, or a box may be drawn around the process module in the rendering. The process module may be made clickable, so that a click on it causes the display to show the suggested replacement from the pool of available modules.

The disclosure also describes a method for manufacturing a modular industrial plant to execute a given industrial process according to a given engineered recipe. According to this method, starting from a given engineered topology of the plant, an optimized topology of the plant is generated using the computer-implemented method described above. Physical process modules are then physically connected according to the optimized topology, so that the modular industrial plant results.

As detailed above, many of the advantages of the methods are brought about by the computerization of the methods. Therefore, the invention also provides a computer program with machine-readable instructions that, when executed by one or more computers, and/or an industrial control system, cause the cone or more computers, and/or the industrial control system, to perform one of the methods described above. The disclosure also provides a non-transitory computer storage medium, and/or a download product, with this computer program.

LIST OF REFERENCES 1 modular industrial plant
2 given topology of plant 1
2* optimized topology
2' candidate optimized topology
21-23 process modules in topology 2
21a-23a resources of modules 21-23
21b-23b theoretical utilization of resources 21a-23a
24-27 available process modules in pool 6
24a-27a resources of modules 24-27
24b-27b theoretical utilization of resources 24a-27a
3 given recipe to be executed by plant 1
6 pool of available process modules 24-27
7 key performance indicator
8 optimality criterion
100 method for optimizing given topology 2
110 obtaining theoretical utilization 21b-23b
115 considering different process modules 21-23 as starting points
117 considering combinations of modules 21-23
120 searching for suitable modules 24-27 in pool 6
121 determining match of input ports I of modules 24-27
122 determining match of output ports O of modules 24-27
123 determining that candidate module 24-27 fits in topology 2
124 determining whether all required ports are connected
125 determining whether missing connection impedes a service
126 determining that candidate modules 24-27 does not fit in topology 2
127 considering combinations of modules 21-23
130 obtaining theoretical utilization 24b-27b
140 generating optimized topology 2*
141 determining that multiple modules 24-27 have same utilizations
142 considering total number of input I and output O ports
143 evaluating value of key performance indicator 7 for modules 24-27
144 choosing candidate module 24-27 with best performance indicator 7
145 obtaining multiple candidate optimized topologies 2'
147 considering combinations of modules 21-23
150 determining key performance indicator 7 for candidate topologies 2'
160 choosing optimized topology 2* from set of candidates 2'
200 method for manufacturing modular industrial plant 1
210 generating optimized topology 2* by method 100
220 physically connecting modules 21-27 in optimized topology 2*

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for optimizing a given topology of a modular plant configured to execute an industrial process according to an engineered recipe, the method comprising:
    obtaining, for an original process module in the given topology, an amount of at least one resource and/or capability of the original process module that is utilized when the industrial process is executed according to the engineered recipe, and dividing the amount by a maximum amount of the respective resource and/or capability that the original process module is able to provide, thereby obtaining a theoretical utilization of the resource and/or capability and assigning the theoretical utilization of the resource and/or capability as the theoretical utilization of the original process module;
    searching, in a pool of available process modules, for one or more candidate process modules that are able to replace the original process module in the execution of the engineered recipe and fit into the given topology;
    obtaining, for each candidate process module, a theoretical utilization of the corresponding resource and/or capability of the respective candidate process module that will ensue when the original process module is replaced by the respective candidate process module;
    assigning the theoretical utilization to each candidate process module;
    generating an optimized topology of the plant from the given topology by replacing the original process module with a candidate process module that has a same or a higher theoretical utilization than the original process module; and
    executing the industrial process by sending commands based on the engineered recipe to process modules of the optimized topology of the plant,
    wherein the resource and/or capability comprises a count of services of the original process module and of the one or more candidate process modules, respectively.

2. The method of claim 1, wherein the given topology and/or the optimized topology comprises:
    feeding at least one input of the industrial process as a whole to at least one input port of the original and/or candidate process module;
    delivering at least one output of the industrial process as a whole from at least one output port of the original and/or candidate process module; and
    providing at least one interconnection between an output port of a first process module and an input port of a second process module.

3. The method of claim 1, wherein the engineered recipe comprises a temporal sequence of process steps, wherein each step of the temporal sequence of process steps comprises sending at least one command to at least one original and/or candidate process module, and/or performing at least one action by the original and/or candidate process module.

4. The method of claim 3, wherein at least one transition between successive steps in the engineered recipe comprises waiting for at least one original and/or candidate process module to reach a state that meets at least one predetermined criterion.

5. The method of claim 1, wherein the pool of available process modules comprises, for each available process module, a mapping between services provided by each available process module and process functions from a predetermined list.

6. The method of claim 5, wherein the pool of available process modules further comprises, for each available process module, a mapping between service parameters and limits of these service parameters, and function parameters of the process functions and limits of these function parameters.

7. The method of claim 1, wherein the services comprise one or more of:
    heating or cooling a substance, and/or keeping the temperature of the substance at a desired value;
    stirring a substance;
    filling at least one vessel with a desired amount of a substance;
    discharging a desired amount of a substance from at least one vessel;
    dosing a desired amount of a second substance into a first substance;
    intermixing a mixture of two or more substances by mechanical interaction with this mixture;

distilling at least one substance from a mixture of two or more substances;

transitioning at least one substance; and inertizing at least one substance.

8. The method of claim 1, wherein the resource and/or capability comprises a quantity of at least one educt processed per unit time, and/or a quantity of at least one product produced per unit time.

9. The method of claim 1, wherein the resource and/or capability comprises a measurement range, and/or a dynamic range of at least one measurement instrument of the original process module or of the candidate process module, respectively.

10. The method of claim 1, wherein determining whether a candidate process module from the pool of available modules fits into the given topology comprises:

for each input port of the original process module that is utilized according to the given topology, determining whether the candidate process module has a corresponding input port;

for each output port of the original process module that is utilized according to the given topology, determining whether the candidate process module has a corresponding output port; and when it is determined that the candidate process module has a corresponding port for each utilized input port and output port of the original process module, determining that the candidate process module fits into the given topology.

11. The method of claim 10, wherein a corresponding input port of the candidate process module is an input port that serves the same process function as the input port of the original process module, and a corresponding output port of the candidate process module is an output port that serves the same process function as the output port of the original process module.

12. The method of claim 11, wherein determining whether a candidate process module from the pool of available modules fits into the given topology further comprises:

determining whether, in a state where all connections to input and output ports of the candidate process module have been made according to the given topology, all input and output ports of the candidate process module that are required for running the utilized services of the candidate process module are connected; and in response to determining that a utilized service of the candidate process module cannot run because a connection to an input or output port is missing, determining that the candidate process module does not fit into the given topology.

13. The method of claim 1, further comprising:

in response to determining that two or more candidate process modules have a same theoretical utilization that is the same or higher than the theoretical utilization of the original process module, choosing the candidate process module with a lowest total number of input and output ports as the candidate process module to replace the original process module.

14. The method of claim 1, further comprising:

for two or more candidate process modules having theoretical utilizations that are at least as high as the theoretical utilization of the original process module, evaluating a value of at least one predetermined key performance indicator that will ensue when the original process module is replaced by the candidate process module, and choosing the candidate process module with a best resulting value of the key performance indicator as the candidate process module to replace the original process module.

15. The method of claim 14, wherein the key performance indicator specifically comprises one or more of: a cost of executing the industrial process; a total number of modules in the industrial plant; a throughput from one or more educts to one or more products of the industrial process as a whole; and energy consumption of the industrial process.

16. The method of claim 1, further comprising:

obtaining the utilized amount of the at least one resource and/or capability for a plurality of different process modules in the given topology;

starting from each of the plurality of different original process modules, generating a respective candidate optimized topology of the plant;

for each candidate optimized topology, determining a value of at least one key performance indicator that will ensue when the candidate optimized topology is implemented; and choosing one optimized topology from the candidate optimized topologies according to the values of the key performance indicator and at least one optimality criterion.

17. The method of claim 16, wherein the key performance indicator specifically comprises one or more of: a cost of executing the industrial process; a total number of modules in the industrial plant; a throughput from one or more educts to one or more products of the industrial process as a whole; and energy consumption of the industrial process.

18. The method of claim 1, wherein:

the utilized amount of the at least one resource and/or capability is obtained for a combination of two or more interconnected process modules;

the searching is specifically performed for candidate process modules that are able to take the place of the combination of two or more original process modules and fit into the given topology; and the optimized topology of the plant is generated by replacing the combination of two or more original process modules with a candidate process module that has a same or a higher theoretical utilization than the combination of two or more original process modules.

* * * * *